Figure 1:
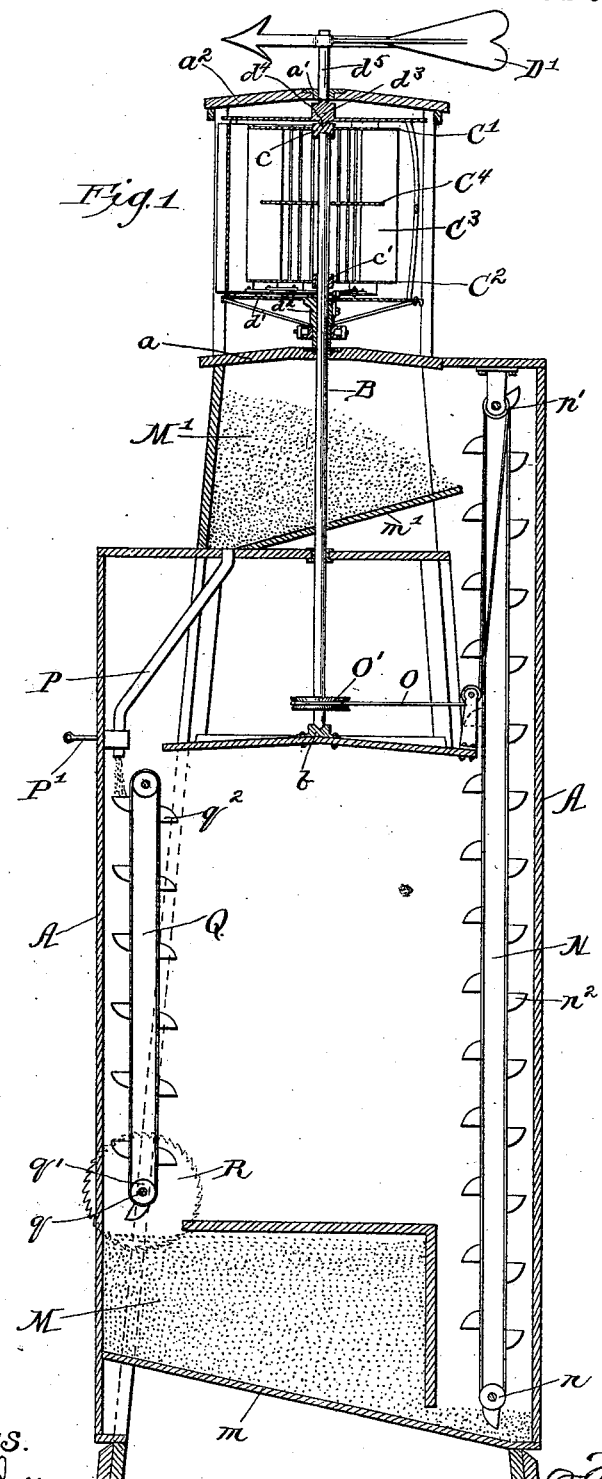

(No Model.)  2 Sheets—Sheet 1.

A. ZWIEBEL.
WINDMILL.

No. 512,352. Patented Jan. 9, 1894.

Witnesses.  Inventor

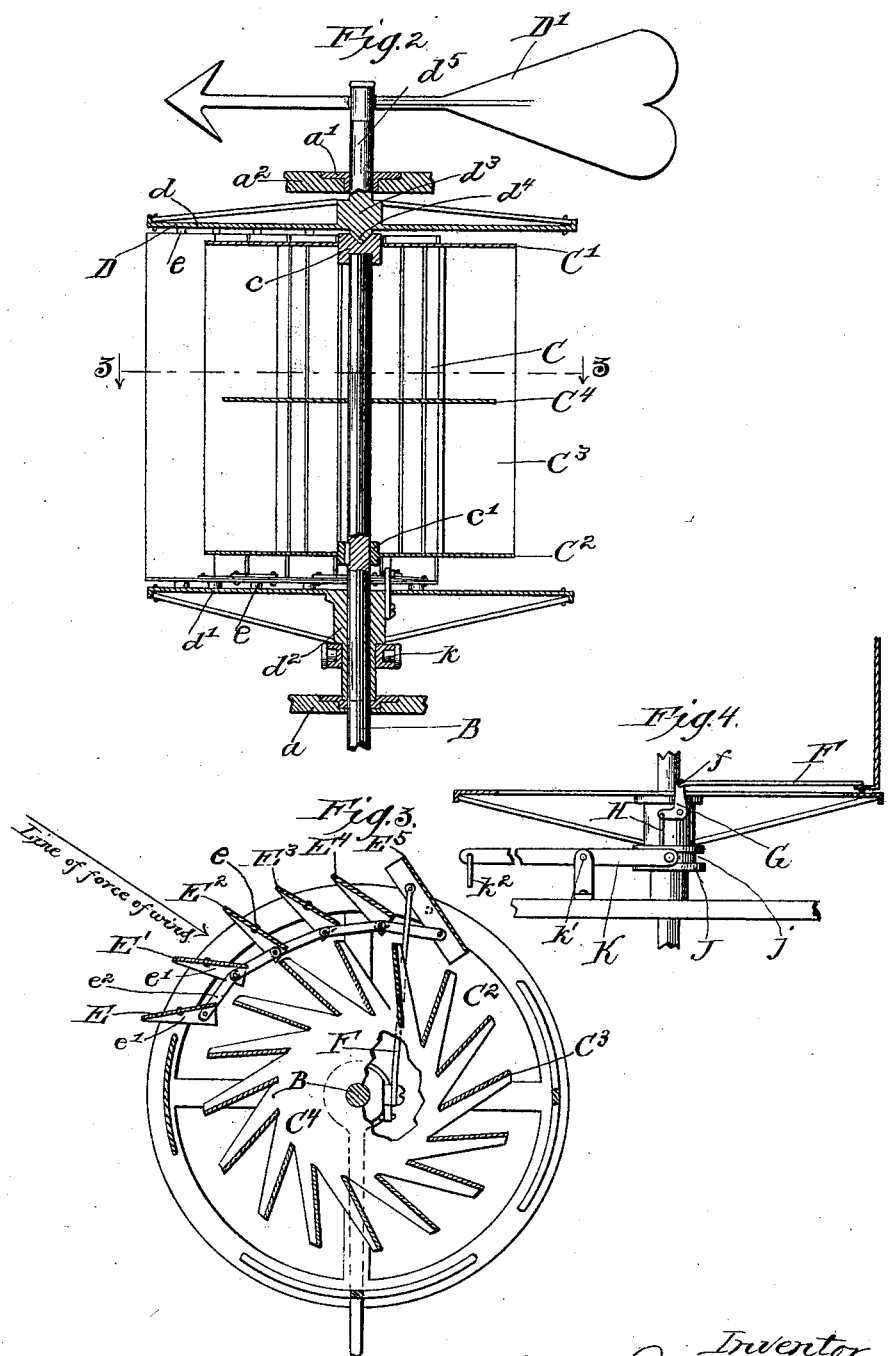

UNITED STATES PATENT OFFICE.

ANTON ZWIEBEL, OF BURLINGTON, WISCONSIN.

WINDMILL.

SPECIFICATION forming part of Letters Patent No. 512,352, dated January 9, 1894.

Application filed April 22, 1893. Serial No. 471,443. (No model.)

*To all whom it may concern:*

Be it known that I, ANTON ZWIEBEL, a citizen of the United States, residing at Burlington, county of Racine, State of Wisconsin, have invented a certain new and useful Improvement in Windmills; and I declare the following to be a full, clear, and exact description of the same, such as will enable others skilled in the art to which it pertains to make and use the same, reference being had to the accompanying drawings, which form a part of this specification.

My invention has for its object the production of a windmill of that class known as horizontal windmills wherein a series of blinds or shutters is used to regulate the amount of wind admitted to the blades of the wheel proper.

My invention relates more particularly to an improved manner of arranging said blinds or shutters so that the wind is directed much more effectually against the wheel proper; the improved mechanism for operating said shutters and the various other features of construction pertaining to the shutters and wheel.

The invention also contemplates the employment of mechanism in connection with a windmill whereby power may be stored up for use when there is less wind to operate the wheel than is required to perform the desired work.

The invention is hereinafter more fully described and claimed.

In the drawings Figure 1 is a vertical section of a windmill embodying my invention. Fig. 2 is a vertical section through the windmill and adjacent blinds or shutters. Fig. 3 is a horizontal section on the line 3—3 of Fig. 2. Fig. 4 is a side elevation of a portion of the apparatus.

In explaining the invention I will first describe the construction of the wind wheel and adjacent mechanism.

A represents any suitable frame work or tower adapted to support the wind wheel at the proper elevation, and B represents a vertical shaft to which the wind wheel proper is engaged. This shaft extends either to the base of the tower, or only part way down as desired. In Fig. 1 I have shown it extended only partly the length of the tower. To the base of this vertical or main shaft is engaged any suitable driving gear whereby the power developed through the revolution of the shaft may be utilized. The shaft is supported at its base by a suitable block $b$ while to the upper end is rigidly keyed the wind wheel C. This wind wheel is framed in the usual manner with a top and bottom plate or frame $C'$, $C^2$ and blades $C^3$ extending between them, and set at the proper angle as shown in Fig. 3. If desired a middle strengthening diaphragm $C^4$ may be provided. The top and bottom plates $C'$, $C^2$ of the wind wheel are provided with blocks $c$, $c'$, the shaft B passing through the block $c'$ (the latter being keyed to it) and into the block $c$.

D is a frame having top and bottom pieces $d$, $d'$ which are supported by the main shaft B, but free to revolve horizontally thereon. The bottom plate $d'$ is provided with a block or fitting $d^2$ which loosely surrounds the shaft B and is supported against vertical movement by the horizontal piece $a$ of the main frame A. The upper plate $d$ of the frame D is provided with a block $d^3$ having a pointed projection $d^4$ which enters the block $c$ of the wind wheel, and also supported by the bearing $a'$ in the horizontal piece $a^2$ of the frame A. The block $d^3$ is provided with an upward projection $d^5$ on which is located a suitable weather vane $D'$. It will thus be seen that as the vane $D'$ veers according to the direction of the wind it will rotate the frame D. On that side of the latter which is held toward the direction from which the wind comes is a series of blinds or shutters E, $E'$, $E^2$, $E^3$, $E^4$, $E^5$. Each of these blinds is provided on each end with a pintle $e$, projecting respectively into the upper and lower plates $d$, $d'$ of the frame, there being orifices in the said upper and lower plates whereby the shutters may be loosely journaled therein. Each of the shutters is provided adjacent to its lower end with a horizontal projection $e'$. The shutters are pivotally connected together by links $e^2$ which extend from one shutter to the next adjacent throughout the entire series, the links being pivoted to the horizontal projections $e'$ so that when one shutter is moved each of the others is also moved. Pivoted to the shutter $E^5$ is a rod F which extends inwardly to a point adjacent to the shaft B where it is pivoted as at $f$ to a bell crank lever G. The other end of the bell crank lever is connected by a rod H with a collar J which is loosely mounted upon the block $d^2$. This collar is provided with a groove $j$ and this groove is engaged by the projections $k$ on a forked lever K which is pivoted at $k'$. Connected with the opposite end of this lever is a rod $k^2$ which extends down to any convenient point where it may, if desired, be connected with any suitable governor apparatus. Now as will be seen a vertical movement of the rod $k^2$, will, through the lever K, collar J, rod H, bell crank lever G, and rod F operate to throw the shutters E to $E^5$. I will now call attention to the position of these shutters as shown in Fig. 3 where they are illustrated as being opened to the widest extent to allow the full force of the wind to strike the blades of the wind wheel. It will be observed that the shutters $E^2$, $E^3$, $E^4$ are substantially parallel with the line of force of the wind and that they are beyond the line of force which passes through the shaft B. Thus the wind that passes through the shutters $E^2$, $E^3$, $E^4$ meets with no resistance at all, but strikes squarely the blades behind these shutters. It will also be observed that the shutters E, E' are placed at such an angle to the line of force of the wind that the wind will be deflected and thrown against those blades which have passed the line drawn through the shaft, that is, those blades that have passed the dead center. It will also be observed that the shutter $E^5$ is substantially double the size of the other shutters and that it is placed at such an angle that the wind which strikes it will be deflected inwardly against the blades of the wheel. It will also be observed that the force exerted upon the shutters E, E' tends to close the shutters, while the force exerted upon the shutter $E^5$ tends to open them and there being substantially the same surface exposed in the shutter $E^5$ as there is in the shutters E, E', the end shutters balance each other, and thus no matter how strongly the wind is blowing the shutters when open will remain substantially in that position. It will also be observed that it requires only the slightest vertical movement of the rod $k^2$ to alter the position of the shutters E to $E^5$ and that when so altered the wind is still against the blades of the wind wheel but in a gradually diminished force until it is entirely shut off. By connecting a suitable governor apparatus to the shaft and engaging it with the rod $k^2$ the slightest variation in the force of the wind can be met by the variation in the size of the openings between the shutters and the volume of wind be increased or diminished to meet the increased or diminished force of the same.

Another feature of my invention is the provision in connection with the wind wheel of suitable means whereby surplus wind not employed to directly perform a given work may be suitably stored to be used when there is no wind. To accomplish this I provide at the base of the tower a suitable receptacle M and at the top of the tower another receptacle M', provided respectively with an inclined bottom $m$, $m'$. In each of these receptacles M, M' is placed a quantity of sand or any other suitable loose material. Upon one side of the tower is a bucket elevator N passing over suitable pulleys $n$, $n'$ at the bottom and top and provided with buckets $n^2$. This elevator is driven by a band O passing around the band wheel O' on the shaft B and around a suitable pulley on the same shaft with the pulley $n'$. Thus a revolution of the wind wheel operates this elevator when picking up the sand from the lower receptacle, elevates it and dumps it into the upper receptacle M'. Leading from the receptacle M' is a chute P provided with a suitable gate or valve P'. This chute terminates adjacent to the upper end of another bucket elevator Q, and upon the shaft $q$ which supports the pulley $q'$ at the lower end of this bucket elevator is any desired tool such as a circular saw R so that the revolution of the shaft $q$ will either directly or through intermediate gearing operate the desired tool to accomplish the work. Now as will be seen when there is no wind, by opening the chute P the contents of the upper receptacle M' may be emptied into the buckets $q^2$ and thus drive the shaft $q^2$, while when there is a surplus wind force, or when it is not desired to utilize the mill to directly drive the working shaft, the elevator N can be employed to elevate the material to the upper receptacle ready to be used at some future time.

It is obvious that instead of sand any other suitable material having the requisite specific gravity might be employed. So also it is obvious that various details in the construction of the windmill proper and its shutter mechanism might be varied without departing from the spirit of my invention.

What I claim is—

1. In a wind mill the combination with the wind wheel of a series of blinds or shutters automatically maintained on the windward side of the wheel, the faces of two or more of said shutters being parallel with each other, substantially as described.

2. In a wind mill the combination with the wind wheel of a series of pivoted blinds or shutters automatically maintained on the windward side of the wheel, two or more of said shutters having their faces parallel with each other, substantially as described.

3. In a wind mill the combination with a wind wheel of a series of blinds or shutters governing admission of wind to the wheel, the faces of two or more of said shutters when opened to the fullest extent being parallel with the line of force of the wind and the faces of the end shutters being at opposite angles to the force of the wind, substantially as described.

4. In a wind mill the combination with the wind wheel of a series of blinds or shutters governing admission of wind to the wheel, the faces of two or more of said shutters, when opened to the fullest extent, being parallel with the line of force of the wind the two shutters at one end of the series being at an angle to the line of force of the wind, and the shutter at the opposite end being at an opposite angle to said line of force and being substantially double the size of the shutter at the other end, substantially as described.

5. A windmill, comprising a wind-wheel, a series of pivoted blinds or shutters for governing admission of wind to said wheel, and so connected together that movement of one shutter shall correspondingly move all of the other shutters; the faces of the end shutters being at opposite angles to the force of the wind, and the faces of the intermediate shutters being parallel to the line of force of the wind when the shutters are fully open, substantially as set forth.

ANTON ZWIEBEL.

Witnesses:
  TODD MASON,
  V. HUGO.